May 6, 1947. W. R. TUCKER 2,420,155
CONTROL MECHANISM FOR HYDRAULIC TRANSMISSIONS
Filed May 31, 1941 2 Sheets-Sheet 1
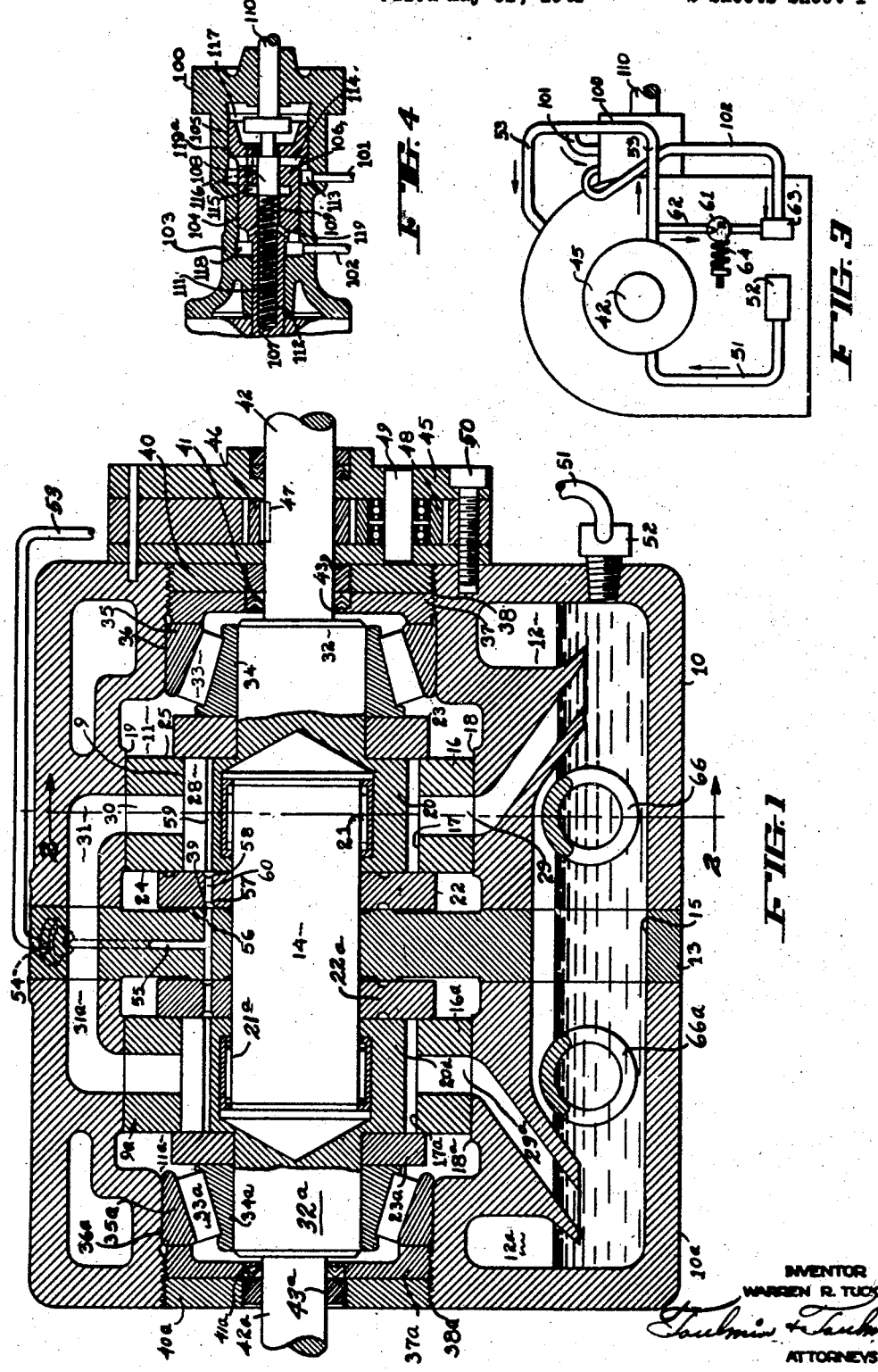
INVENTOR
WARREN R. TUCKER
ATTORNEYS May 6, 1947.  W. R. TUCKER  2,420,155
CONTROL MECHANISM FOR HYDRAULIC TRANSMISSIONS
Filed May 31, 1941  2 Sheets—Sheet 2
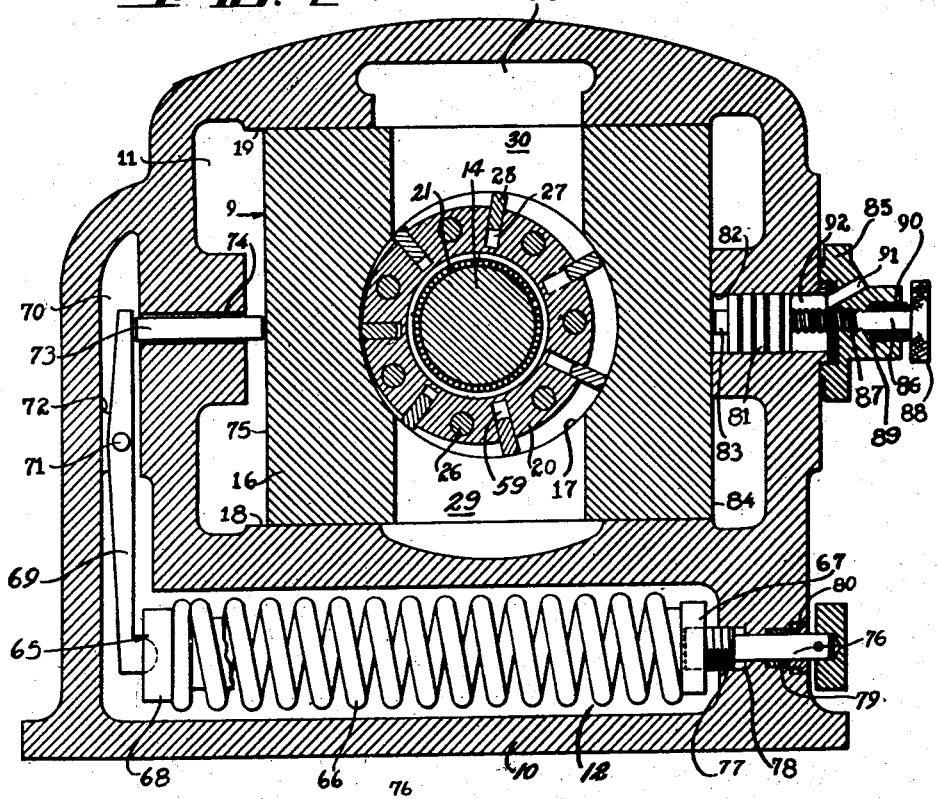
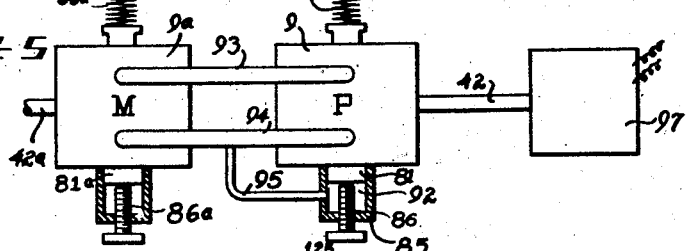
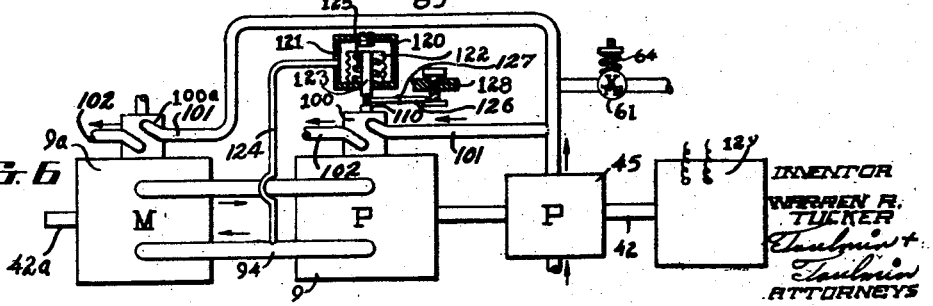

Patented May 6, 1947

2,420,155

UNITED STATES PATENT OFFICE 2,420,155

CONTROL MECHANISM FOR HYDRAULIC TRANSMISSIONS

Warren R. Tucker, Oakwood, Ohio, assignor to The Hydraulic Development Corporation, Inc., Wilmington, Del., a corporation of Delaware Application May 31, 1941, Serial No. 396,033

6 Claims. (Cl. 60—53)

This invention relates to hydraulic transmissions wherein the motor and pump elements are variable in their displacement, and more particularly relates to means for controlling the speed of output developed by the transmission and the torque obtained from the transmission.

An object of the invention is to provide a hydraulic transmission which will produce a substantially constant torque transmitted by the shaft thereof.

Another object of the invention is to control a hydraulic transmission in response to the torque to vary the displacement of the mechanisms of the transmission to maintain substantially constant torque transmission by the drive shaft thereof.

Another object of the invention is to provide a hydraulic transmission which will automatically reduce its delivery in response to the load imposed upon the transmission.

It is another object of the invention to provide a hydraulic transmission which will reduce its speed as the torque load tends to increase thereby maintaining the load on the driving apparatus substantially constant.

Another object of the invention is to provide a hydraulic transmission which will prevent overloading of the driving apparatus.

It is another object of the invention to provide a hydraulic transmission the speed of which can be varied manually or automatically, and has mechanism which will automatically prevent overloading of the driving apparatus regardless of the speed which is imposed upon the transmission by the speed changing mechanism.

It is another object of the invention to provide a hydraulic transmission which will automatically shift the pumping mechanism to neutral when the load imposed upon the transmission rises above a safe limit.

It is another object of the invention to provide a hydraulic transmission wherein vane pumps are used as the pump and motor thereof, and wherein a pilot pump is used for delivering pressure to the vanes to maintain them in operating position, which pilot pressure becomes a safety control when undue pressure is developed within the transmission.

It is another object of the invention to provide a transmission in accordance with the foregoing object wherein the pilot pump also delivers fluid to serve the motor for changing the eccentricity of the pumping mechanism.

It is another object of the invention to provide a hydraulic transmission wherein the pump and motor are both variable as to their displacement, and wherein mechanism is provided for automatically changing the displacement of the pump or motor for altering the speed output of the transmission.

Another object of the invention is to provide a transmission in accordance with the previous object wherein the apparatus for controlling the displacement of the pump or motor is actuated in response to pressure developed within the transmission for maintaining substantially constant torque development at the output of the transmission.

It is another object of the invention to provide a hydraulic transmission wherein the displacement of the pump and motor is variable having means for manually controlling the speed output of the transmission and means for automatically controlling the load imposed upon the driving apparatus by the transmission.

It is another object of the invention to provide a hydraulic transmission having a pump and motor which are variable in displacement and means providing a safety control of maximum pressure developed by the transmission.

Further objects and advantages will become apparent from the drawings and the following description.

In the drawings:

Figure 1 is a longitudinal cross-sectional view of a hydraulic transmission which can be used in combination with the features of this invention.

Figure 2 is a transverse cross-sectional view taken along line 2—2 of Figure 1.

Figure 3 is a diagrammatic representation of a transmission having a pilot pump for serving the vanes of the vane pump used as pump and motor of the transmission and for serving the servomotor used for controlling the eccentricity of the vane pump mechanisms.

Figure 4 is a cross-sectional view of a somewhat simplified form of servomotor.

Figure 5 is a diagrammatic representation of a hydraulic transmission incorporating control features of this invention.

Figure 6 is a diagrammatic representation of a hydraulic transmission incorporating control features of this invention in a modified arrangement.

This invention relates to hydraulic transmissions wherein the eccentricity of the pumping unit and the motor unit, either or both, is variable, whereby the displacement of either the motor or the pumping unit is changed to control the speed of output of the transmission. Automatic control mechanisms are associated with the motor and pumping units to regulate the changes in displacement in accordance with certain pressure conditions within the transmission to produce a transmission which is responsive to the load conditions imposed upon the transmission and thereby establish a substantially constant torque output. The control mechanisms can also function as safety devices to unload the primary source of power should the load imposed upon the transmission become too great to be handled by the primary source of power. The control system of this invention is applicable to any hydraulic transmission wherein the pump and motor units have variable displacements and, while a particular transmission will be hereinafter described which in combination with other features of the invention has special functions, it is to be understood that the structural arrangement of the transmission can be altered without departing from the spirit of the control features of the invention. The particular transmission described hereinafter is associated with the pilot pump which establishes substantially constant pressure to the vanes of the vane type pumps used as the motor and power unit of the transmission. The constant pressure supplied by the pilot pump provides a feature of safety control in a vane type pump which is somewhat special to a mechanism wherein hydraulic pressure is used to maintain the operative position of the pumping devices whether they be vanes or pistons. The other control features of the invention however are applicable to any hydraulic transmission having variable displacement of the pump and motor units.

In this invention the hydraulic transmission described herein consists of a pair of vane pumps which are structurally identical. The power or pumping unit only will be referred to in the following description but the elements of like character of the motor unit will be identified by the same numeral but with the suffix a.

The vane pump unit consists of a casing 10 having a work chamber 11 and a liquid storage chamber 12. The casing 10 of the pump unit 9 and the casing 10a of the motor unit 9a are separated by a partition 13 within which there is mounted a stub shaft 14 which extends on both sides of the partition 13. The casings 10 and 10a are secured to the partition 13 by suitable bolts to provide a unit casing for the motor 9a and pump unit 9. The partition 13 has an opening 15 therein for interconnecting the reservoir compartments 12 and 12a for storage of hydraulic liquid therein and to permit circulation of the flow of liquid from the motor unit in the working compartment 11a to the pump unit in the working compartment 11.

The vane pump unit consists of a cylinder 16 of substantially rectangular form having a cylindrical bore 17 therein which provides the cylinder wall for the pumping unit. The cylinder block 16 is positioned between parallel planar faces 18 and 19 provided in the pump casing 10. The cylinder 16 is adapted to reciprocate with respect to the casing, on faces 18 and 19 provided in the pump casing 10, under control of suitable mechanism which is hereinafter described.

A rotor 20 is positioned within the cylinder bore 17 and is consequently mounted upon the stub shaft 14 by means of the needle bearings 21. End closure plates 22 and 23 are positioned adjacent opposite end faces of the rotor 20, which end plates are in engagement with the planar faces 24 and 25 of the cylinder 16. A plurality of bolts 26 secure the end plates 22 and 23 and the rotor 20 together as a unit assembly.

The rotor 20 is provided with a plurality of radial slots 27, each of which slots is adapted to carry a vane 28. Rotation of the vanes within the cylindrical bore 17 produces a flow of liquid between the passages 29 and 30 provided in the cylinder 16, whereby fluid is circulated by the pump to or from the reservoir 12 and is conducted to or taken from the passage 31 provided in the casing 10 in accordance with the eccentricity of the cylinder with respect to the rotor. If the eccentricity of the cylinder is as shown in Figure 2 the flow through the pump unit will be in one direction, whereas, if the eccentricity is 180° opposite that shown in Figure 2, the flow of fluid through the pump will be in the opposite direction while the rotor rotation remains in the same direction as before.

The rotor 20 has a reduced diameter shaft 32 extending therefrom which carries a tapered roller bearing 33 the inner race 34 of which is carried upon the shaft 32 while the outer race 35 is carried within a recess 36 provided in the end wall of the casing 10. An externally threaded plug 37 is in threaded engagement with a threaded opening 38 provided in the end wall of the casing 10 and is in engagement with the race 35 of the roller bearing 33 for applying pressure through the roller bearing 33 upon the pump assembly to urge the same in a leftward direction as viewed in Figure 1 and thereby retain the end closure plate 22 in engagement with the annular boss 39 provided upon the face of the partition 13. A locking plug 40 is also in engagement with the threaded opening 38 for securing the plug 37 in position.

The reduced diameter shaft 32 has a reduced diameter shaft 42 integral therewith which extends through the opening 43 provided in the plugs 37 and 40 in the end wall of the casing 10. The shaft 42 is connected to a suitable driving mechanism which operates the transmission, while the shaft 42a is connected to a mechanism driven by the transmission. A packing gland 41 is provided between the shaft 42 and the plugs 37 and 40.

A pilot pump 45 which may be of the common gear type is carried upon the shaft 42 and has one gear 46 thereof driven by the shaft 42 through means of a suitable key 47. A gear 48 is carried upon a stub shaft 49 and is in meshing relationship with the gear 46. Such a gear pump is well known in the art and it is not believed that further description is necessary. The pilot pump 45 is secured to the casing 10 by means of suitable bolts 50.

The inlet side of the pilot pump 45 is connected by means of a conduit 51 to a fitting 52 in communication with the fluid reservoir 12. The discharge side of the pilot pump 45 is connected to a conduit 53 which is connected to a fitting 54 provided in the partition 13.

A passage 55 is provided in the partition 13 and extends from the fitting 54 to a transverse passage 56 provided in the partition 13. The transverse passage 56 is in communication with an annular groove 57 provided in the closure plate 22. A second annular groove 58 is provided in the opposite face of the closure plate 22 and is in communication with a space 59 provided beneath the vanes 28 within the rotor 20. A passage 60 connects the annular groove 57 with the annular groove 58 to conduct liquid from the passages 55 and 56 to the under side of the vanes 28 when the pilot pump is delivering fluid through the conduit 53.

When the hydraulic transmission is operating the pilot pump 45 withdraws fluid from the reservoir 12 through the fitting 52 and the conduit 51 and delivers the same through the conduit 53 to the under side of the vanes. The pressure of the liquid delivered by the pilot pump 45 is maintained relatively constant through means of a pressure relief valve 61 positioned in the by-pass line 62 interconnecting the conduit 53 with the fluid reservoir 12 through means of the fitting 63. The pressure relief valve 61 opens when the pressure in the conduit 53 reaches a predetermined level to by-pass all excess fluid and thus maintain pressure in the conduit 53 substantially constant. The pressure relief valve 61 is provided with an adjusting mechanism 64 for regulating the pressure at which the valve 61 will open, thus providing means to control the pressure applied to the under side of the vanes 28.

With a substantially constant pressure applied to the under side of the vanes 28 the maximum pressure developed within the pumping mechanism is controlled to prevent the development of undue high pressure. The passages 31 and 31a receive the liquid discharged by the pump 9 within the work chamber 11. The pressure within the passages 31 and 31a exerts a force upon the outer ends of the vanes 28 attempting to move the vane inwardly against the pressure existing in the space 59 below the vane 28. When the pressure in the passages 31 and 31a reaches a certain predetermined level the force exerted upon the outer ends of the vanes 28 will move the vanes inwardly against the pressure in the space 59. The pressure at which this will occur depends upon the pressure existing within the space 59 and the relative surface areas exposed to the pressures above and below the vanes 28. The constant pressure applied to the under side of the vanes 28 thus becomes means for regulating the maximum pressure developed within the pumping mechanisms of the transmission and thus becomes a safety control to prevent over-loading of the transmission should the power shaft 42a be stalled or be caused to direct a heavier load upon the motor of the transmission than the pumping mechanism is designed to carry.

The pump 9 and the motor 9a are each provided with a mechanism for shifting the cylinders 16 and 16a respectively with respect to the rotors 20 and 20a, whereby the displacement within the cylinder bores 17 and 17a are varied and thereby altering the speed output of the motor shaft 42a. The shifting mechanisms for the cylinders 16 and 16a are adapted to be manually controlled for altering the speed output of the transmission, or may be automatically controlled for regulating the torque output of the pump or controlling the output speed thereof.

The control mechanisms are identical in structure and therefore a description of the control mechanism associated with the pump unit 9 will suffice for the control mechanism of the motor unit 9a.

The control device 65 for the pump unit 9 consists of a spring 66 positioned within the storage chamber 12 having one end thereof carried by an adjustable abutment 67 and the opposite end carried by a stud 68 in engagement with the end of a lever 69. The lever 69 is positioned within a recess 70 provided in the casing 10 and is pivoted upon the pin 71 carried by a boss 72. The end of the lever 69 opposite the end in engagement with the spring 66 engages a pin 73 slidably positioned within a bore 74 provided in the wall of the work chamber 11. The inner end of the pin 73 engages the end wall 75 of the cylinder 16. The spring 66 urges the lower end of the lever 69 in a leftward direction as viewed in Figure 2 and thereby urges the upper end of the lever 69 in a rightward direction for moving the pin 73 into engagement with the cylinder 16 and thus urging the cylinder in a rightward direction to place the pump in its maximum volume position.

The abutment 67 is carried upon a pin 76 which has a threaded portion 77 in threaded engagement with the threaded opening 78 provided in the wall of the casing 10. The pin 76 is provided with a packing gland 79 and a packing nut 80 for sealing the opening 78. Rotation of the pin 76 varies the compression of the spring 66 and thereby alters the pressure developed within the pump capable of overcoming the spring compression to move the cylinder 16 in a leftward direction toward neutral position.

A control piston 81 is slidable within a bore 82 provided in the casing 10 and has a protruding end portion 83 in engagement with the wall 84 of the cylinder 16, which wall 84 is opposite to the wall 75 so that movement of the control piston 81 opposes movement of the spring 66 through the pin 73.

The control piston 81 is moved either manually or in response to pressure developed within the pump 9 to control the degree of eccentricity of the cylinder 16 with respect to the rotor 20.

A fitting 85 carries a stem 86 in threaded engagement therewith within the threaded opening 87. The inner end of the stem 86 is adapted to be placed in engagement with the control piston 81, while the outer end of the stem 86 carries a wheel 88 for rotating the same to vary the position of the inner end of the stem 86 and thus the position of the control piston 81. A packing gland 89 and a packing nut 90 seals the stem 86 to prevent flow of fluid from within the pumping unit.

The fitting 85 has a passage 91 which is adapted to be connected by means of a suitable conduit to the discharge passage 31 of the pump 9 for conducting liquid under pressure to the chamber 92 provided between the fitting 85 and the casing 10. The piston 81 is freely reciprocable within the bore 82 so that when pressure within the chamber 92 increases sufficiently, the force applied by the piston 81 in a leftward direction will overcome the action of the spring 66 to move the cylinder 16 toward neutral position. The pressure at which the cylinder 16 will move toward neutral is controlled by the spring 66 and can be adjusted over a wide range to produce any desired torque effect upon the motor 9a, which pressure is limited only by the capacity of the mechanism driving the pump 9.

Figure 5 disclosed diagrammatically a transmission wherein the motor 9a and the pump 9 are interconnected in circuit flow relationship by conduits 93 and 94. The springs 66 and 66a urge the cylinders of the motor and pump toward full stroke position while the adjusting stems 86 and 86a acting through pistons 81 and 81a oppose the action of the springs 66 and 66a tending to move the cylinders of the motor and pump toward neutral. A conduit 95 interconnects the discharge conduit 94 of the pump 9 with the chamber 92 provided in the adjusting device 85. The springs 66 and 66a are of sufficient strength to normally retain the motor and pump on full stroke position at all times. The cylinder of the pump 9 will be moved toward neutral position when pressure in the conduits 94 and 95 rises above a predetermined level as determined by the spring 66. The shaft 42 of the pump 9 is connected to an electric motor 97 while the shaft 42a of the motor 9a is connected to a mechanism driven by the transmission. Under normal operating conditions the cylinder of the motor 9a is set in a predetermined eccentric position with respect to the rotor thereof by means of the adjusting screw 86a. The spring 66a maintains the position of the cylinder of the motor with respect to the rotor, while the screw 86a limits the action of the spring 66a to regulate the relative positions of the cylinder and rotor. The pump 9 is also set to a predetermined eccentric position to obtain the desired delivery from the pump to the motor 9a to produce the desired speed delivery through the shaft 42a. The displacements of the motor and pump can thus be varied over a considerable range and thereby obtain a wide range of shaft speeds of the output shaft 42a.

The electric motor 97, or any other propulsion apparatus for driving the pump 9, has a predetermined operating capacity above which the power mechanism will stall. The spring 66 of the pump 9 can be used to produce two different functions of operation of the transmission. First, the compression of the spring 66 can be set by the adjusting screw 76 to permit pressure to build up within the pump 9 to a point at which the full capacity of the power mechanism or electric motor 97 is utilized and above which the power mechanism would stall. When this pressure has been reached by the pump 9, the discharge pressure will be transmitted from the discharge conduit 94 through the conduit 95 to the space 92 of the control mechanism 85. The pressure within the chamber 92 will move the piston 81 inwardly and thereby shift the cylinder 66 with respect to the motor 20 to neutral thereby halting the delivery of liquid by the pump 9. Sufficient liquid however will be continued to be delivered by the pump 9 to maintain the pressure developed within the conduit 94 for transmission to the motor 9a, whereby the motor will apply maximum torque effort upon the drive shaft of the motor for driving the apparatus driven by the motor shaft 42a. The spring 66 thus becomes a safety control for the transmission. Regardless of the load imposed upon the motor 9a the pump 9 cannot produce a pressure above the predetermined maximum pressure as determined by the spring 66 so that even though the motor should stall due to the load condition the pump will automatically be shifted to neutral and even though it continues operation there will be no delivery of liquid to the motor until the load condition upon the motor has been relieved after which the pump will continue operation of the motor and pick up a lessened load. Such a safety control feature on a hydraulic transmission is advantageous where the load conditions upon the motor of the transmission vary over wide ranges such as in steam shovels and like apparatus. It is possible to obtain maximum power output through the transmission up to the capacity of the power mechanism without stalling the power mechanism and without causing damage to the transmission in attempting to overload the same.

The second use of the spring 66 upon the pump 9 is to maintain a substantially constant torque transmitted by the motor shaft 42a. Under these conditions the compression of the spring 66 will be adjusted so that the pressure developed within the pump, while considerably less than the maximum pressure capable of being transmitted by the pump, will nevertheless be equal to the pressure required to develop the desired torque by the motor shaft 42a at the particular speed of operation thereof. When the spring 66 is functioning as a torque control the maximum output of the power mechanism 97 is not used. To obtain the desired speed and pressure relationship between the motor and the pump the adjusting mechanisms 86 and 86a are properly positioned.

When the spring 66 is functioning as a torque control the pump 9 will be operating at a pressure less than its maximum so that any variation in load upon the motor shaft 42a reflects directly upon the pressure developed by the pump 9. Any increase of load upon the shaft 42a has the effect of retarding the rotation of the shaft 42a in the normal direction of rotation so that it takes a greater pressure in the motor with a constant volume delivery to carry the load if the rotation of the shaft 42 is not to slow down. However, if the torque transmitted by the motor shaft 42a is to remain substantially constant, the pressure applied on the motor 9a by the pump 9 must remain substantially constant. Thus, when the motor tends to force the pressure upwardly in it and the pump, the pump is shifted toward neutral position to reduce the delivery therefrom and yet hold substantially the same pressure as before increased only by the additional resistance of the spring 66. The effect of the pressure increase in the conduits 94 and 95 will thus be transmitted to the piston 81 which will move the cylinder 16 of the pump 9 toward concentric position to reduce the delivery thereof until the pressure in the conduits 94 and 95 is equal to the resistance of the spring 66. The balance of opposing forces obtained by the spring 66 and the pressure within the chamber 92 of the adjusting device 85 maintains a relatively constant pressure of delivery within the conduits 94 and 95, increased only by the added resistance of the spring 66 upon increased compression thereof, regardless of the volume delivered by the pump. When the volume delivered by the pump 9 is reduced and therefore the speed of operation of the motor is reduced, with substantially the same pressure present in the motor, the torque transmitted by the motor shaft 42a will remain substantially constant but at a reduced speed. It is thus seen that the control mechanism of the transmission of this invention can maintain the torque transmitted by the drive shaft thereof substantially constant with a slight sacrifice of speed of operation.

While the liquid pressure for operating the control piston 81 has been described as being a pressure transmitted from the discharge conduit of the pump 9, it is also to be understood that the internal working pressure of the pump can also be used to provide the control tending to move the pump to neutral position. This is particularly true of the vane type pumps. If the internal working pressure of the pump is used to shift the cylinder to neutral position upon development of a predetermined pressure then the control piston 81 can be dispensed with. However, the manual control for pre-setting the displacement relationship of the motor and pump will be retained to control the speed regulation of the output shaft 42a and the motor 9a. It is to be understood that if the internal pressure developed by the pump is used for shifting the cylinder that the spring 66a of the motor 9a will be sufficiently strong to prevent shifting of the motor cylinder at any time to prevent the motor 9a from tending to increase its speed by shifting of the cylinder thereof toward neutral position. The spring 66 could thus be considerably lighter than the spring 66a and could control the operation of the pump 9 in the same manner as heretofore described depending upon the degree of compression of the spring and whether it is to be used only as a safety control or as a substantially constant torque control.

The manual control heretofore described of the pump and motor, 9 and 9a, is satisfactory on all small hydraulic transmissions. However, when the transmissions are of relatively large size, or when the pressure produced in the transmission is of a relatively high order difficulty is encountered in shifting the cylinder purely by manual means. It is therefore desirable under certain conditions to provide a servomotor for shifting the cylinders of the pump or motor. A somewhat simplified form of servomotor 100 is disclosed in Figure 4. The pilot pump 45 is adapted to supply fluid pressure to the servomotor 100. The discharge side of the pilot pump 45 is connected to the servomotor 100 by means of a conduit 101 which is a branch line of conduit 53. The discharge side of the servomotor 100 is connected by means of a conduit 102 to the fitting 63 for returning liquid to the liquid storage chamber 12 within the casing 10.

The servomotor 100 consists of a body 103 having two cylinder bores 104 and 105 in coaxial alignment of which the cylinder bore 105 is the larger. A step diameter piston 106 is positioned within the cylinder bores 104 and 105 and is adapted to be slidable therein. The piston 106 is provided with an axially extending portion 107 in engagement with the cylinder of either the pump 9 or the motor 9a. It is to be understood of course that a separate servomotor is provided for the motor and pump. A piston 108 is carried within a cylinder bore 109 provided within the piston 106. The piston 108 is connected to a control rod 110 which extends exteriorly of the servomotor 100 and is connected either to a manual control device or an automatic control device. A spring 111 is carried within a bore 112 provided within the piston 106 for normally urging the piston 108 in the rightward direction.

The conduit 101 is in communication with an annular groove 113 which in turn communicates through a transverse passage 114 with the interior of the cylinder bore 109. An annular recess 115 is provided around the cylinder bore 109 and communicates through a longitudinal passage 116 with a space 117 provided at the righthand end of the piston 106.

The return conduit 102 communicates with an annular groove 118 which communicates with the interior of the cylinder bore 109 by means of a passage 119.

The piston 108 normally spans the annular groove 115 and the passage 114 so that hydraulic pressure within the annular groove 113 urges the piston 106 in a rightward direction against the rod 110 which limits the rightward movement of the piston 106. When the cylinder of the pump with which the servomotor is associated is to be shifted to neutral with respect to the rotor the control rod 110 is moved in a leftward direction whereby the piston 108 uncovers the edge of the passage 114 to permit fluid to flow to the righthand side of the piston 106 through the cylinder bore 109. The piston 106 then moves in a leftward direction due to the pressure existing within the chamber 117 until the passage 114 is again closed by means of the end of the piston 108.

When the eccentricity of the cylinder is to be increased with respect to the rotor of either the pump or motor the control 110 is moved in a rightward direction whereby the liquid under pressure within the annular groove 113 is transmitted to the reduced diameter area 119a on the left-hand end of the larger diameter portion of the piston 106. When the piston 108 uncovers the left-hand edge of the annular groove 115 the chamber 117 is in communication with the return conduit 102 through means of the passage 116, the groove 115 and the passage 119 whereby liquid can flow from the chamber 117 when the piston 106 is moved in a rightward direction until the left-hand edge of the annular groove 115 is closed by means of the piston 108.

The pilot pump 45 thus produces a second function of operation upon the hydraulic transmission.

In order to operate the servomotor automatically in response to load conditions imposed upon the motor 9a of the transmission it is necessary that a pressure control be associated with the servomotor which is responsive to the pressure existing within the discharge conduit of the pump 9. Figure 6 is a diagrammatic representation of a hydraulic transmission having a pilot pump for serving the servomotors of the pump and motor of the transmission, and wherein a pressure control is provided for the servomotor on the pump of the transmission for controlling the same in response to the pressure conditions in the discharge side of the pump. A suitable manual control is also provided upon the servomotor associated with the pump of the transmission.

The servomotors 100 and 100a of the pump 9 and the motor 9a are of the type just described. The servomotor 100 has an automatic pressure control device 120 associated therewith consisting of a chamber 121 enclosing a Sylphon bellows 122. The Sylphon bellows 122 has a plunger 123 extending therefrom which is connected to the control rod 110 of the servomotor 100.

A conduit 124 connects the discharge conduit 94 of the pump 9 with the interior of the chamber 121 so that an increase of pressure within the chamber 121 tends to collapse the bellows 122 against the spring 125 to move the control rod 110 in a downward direction and thus shift the cylinder of the pump toward concentric position.

A manual control of the setting of the eccentricity of the cylinder for the pump 9 consists of a lever 126 pivoted at 127 having one end thereof connected to the control rod 110 and the opposite end thereof in engagement with an adjusting screw 128. The adjusting screw 128 limits the upward movement of the control rod 110 as urged by the spring 125 to thereby regulate the eccentric position of the cylinder of the pump 9. Upward movement of the screw 128 causes downward movement of the control rod 110 to decrease the eccentricity of the pump 9 while downward movement of the screw 128 permits upward movement of the control rod 110 as urged by the spring 125 to thus limit the eccentric position of the pump 9. The spring 125 urges the bellows 122 to expand upwardly and thus cause the servomotor to retain the cylinder of the pump 9 upon eccentric position until the pressure in the conduits 94 and 124 is sufficient to overcome the force exerted by the spring 125, at which time the bellows 122 will be collapsed and the control rod 110 will be moved downwardly by means of the pressure against the action of spring 111 within the servomotor 100 to shift the cylinder toward neutral position.

The power mechanism or electric motor 129 drives the pilot pump 45 since it is mounted upon the shaft 42 for the pump 9 whereby the pilot pump always supplies pressure to the servomotors 100 and 100a at any time the transmission is in operation. The operation of the system of Figure 6 is identical with the operation of the system of Figure 5 so that the control mechanism of the pump 9 will operate either as a safety control only or as a constant torque control for the motor 9a.

Having thus fully described my invention, what I claim as new and desire to secure by Letters Patent is:

1. A hydraulic transmission comprising; a pump unit consisting of a cylinder, a rotor disposed within said cylinder and having a plurality of vanes movable therein and extending therefrom into engagement with the walls of said cylinder, spring means for moving said cylinder with respect to said rotor to position the same eccentrically thereto and place said pump unit on full stroke position, piston means opposing said spring means for moving said cylinder to place the same on neutral stroke position, manual means for actuating said piston means and thus moving said cylinder to pre-set the position of the cylinder with respect to said rotor and control the volume delivery of said pump unit, a motor unit consisting of a cylinder, a rotor disposed within said cylinder and having a plurality of vanes movable therein and extending therefrom into engagement with the walls of said cylinder, spring means for moving said cylinder with respect to said rotor to position the same eccentrically thereto and place said motor unit on full stroke position, manual means opposing said spring means for moving said cylinder to pre-set the position of the cylinder with respect to said rotor and control the output speed thereof; means connecting said pump unit and said motor unit in a closed fluid circuit relationship; a pilot pump drivingly connected to said pump unit and operated concomitantly therewith, means regulating the maximum delivery pressure from said pilot pump means connecting the discharge side of said pilot pump with the under side of the vanes of said pump unit to retain the same in engagement with the cylinder wall thereof, said vanes of said pump unit having the ends thereof engaging the cylinder wall exposed to the pressure in said pump unit whereby said vanes collapse against said pilot pump pressure to relieve excessive pressure conditions in said pump unit; and means for conducting fluid pressure from the discharge side of said pump unit to said piston means for applying hydraulic pressure thereon to actuate the same to overpower said pump unit spring means whenever the discharge pressure from the pump unit is greater than the force exerted by the pump unit spring means.

2. A hydraulic transmission comprising; a pump unit consisting of a cylinder, a rotor disposed within said cylinder and having a plurality of vanes movable therein and extending therefrom into engagement with the walls of said cylinder, spring means for moving said cylinder with respect to said rotor to position the same eccentrically thereto and place said pump unit on full stroke position, servomotor means opposing said spring means for moving said cylinder to place the same on neutral stroke position, a pilot pump drivingly connected to the pump unit adapted to be driven thereby whenever the pump unit is in operation, means for regulating the maximum pressure produced by said pilot pump, means connecting said pilot pump to said servomotor for conducting fluid to said servomotor for actuating the same, manual means for initiating actuation of said servomotor whereby said fluid from said pilot pump can complete actuation thereof and thus move said cylinder to pre-set the position of the cylinder with respect to said rotor and control the volume delivery of said pump unit; a motor unit consisting of a cylinder, a rotor disposed within said cylinder and having a plurality of vanes movable therein and extending therefrom into engagement with the walls of said cylinder, spring means for moving said cylinder with respect to said rotor to position the same eccentrically thereto and place said motor unit on full stroke position, manual means opposing said spring means for moving said cylinder to pre-set the position of the cylinder with respect to said rotor and control the output speed thereof; means connecting said pump unit and said motor unit in a closed fluid circuit relationship; and means connecting the discharge side of said pump unit with said servomotor to apply the discharge pressure thereupon to overpower said pump unit spring means whenever the discharge pressure from the pump unit is greater than the force exerted by the pump unit spring means.

3. A hydraulic transmission comprising; a pump unit consisting of a cylinder, a rotor disposed within said cylinder and having a plurality of vanes movable therein and extending therefrom into engagement with the walls of said cylinder, spring means for moving said cylinder with respect to said rotor to position the same eccentrically thereto and place said pump unit on full stroke position, servomotor means opposing said spring means for moving said cylinder to place the same on neutral stroke position including a power piston for actuating said cylinder and a control piston slidable within said power piston for valving fluid flow to opposite ends of said power piston, a pilot pump drivingly connected to the pump unit adapted to be driven thereby whenever the pump unit is in operation, means for regulating the maximum pressure produced by said pilot pump, means connecting said pilot pump to said servomotor for conducting fluid to said servomotor for actuating the same and for applying fluid pressure on one side of said power piston for always urging the same in one direction, manual means for initiating actuation of said servomotor whereby said fluid from said pilot pump can complete actuation thereof and thus move said cylinder to pre-set the position of the cylinder with respect to said rotor and control the volume delivery of said pump unit; a motor unit consisting of a cylinder, a rotor disposed within said cylinder and having a plurality of vanes movable therein and extending therefrom into engagement with the walls of said cylinder, spring means for moving said cylinder with respect to said rotor to position the same eccentrically thereto and place said motor unit on full stroke position, manual means opposing said spring means for moving said cylinder to pre-set the position of the cylinder with respect to said rotor and control the output speed thereof; means connecting said pump unit and said motor unit in a closed fluid circuit relationship; and means operably connecting the discharge side of said pump unit with said servomotor to apply the discharge pressure thereupon to overpower said pump unit spring means whenever the discharge pressure from the pump unit is greater than the force exerted by the pump unit spring means.

4. A hydraulic transmission comprising; a pump unit consisting of a cylinder, a rotor disposed within said cylinder and having a plurality of vanes movable therein and extending therefrom into engagement with the walls of said cylinder, spring means for moving said cylinder with respect to said rotor to position the same eccentrically thereto and place said pump unit on full stroke position, servomotor means opposing said spring means for moving said cylinder to place the same on neutral position, manual means for moving said servomotor means and thus moving said cylinder to pre-set the position of the cylinder with respect to said rotor and control the volume delivery of said pump unit; a pilot pump drivingly connected to said pump unit for operation therewith, means controlling the maximum pressure developed by said pilot pump, means connecting the discharge side of said pilot pump to said servomotor for power actuation thereof, means for conducting fluid pressure from said pilot pump to the underside of said vanes in said pump unit rotor to regulate the force applied upon said vanes maintaining them in engagement with said pump unit cylinder, a motor unit consisting of a cylinder, a rotor disposed within said cylinder and having a plurality of vanes movable therein and extending therefrom into engagement with the walls of said cylinder, spring means for moving said cylinder with respect to said rotor to position the same eccentrically thereto and place said motor unit on full stroke position, manual means opposing said spring means for moving said cylinder to pre-set the position of the cylinder with respect to said rotor and control the output speed thereof; means connecting said pump unit and said motor unit in a closed fluid circuit relationship; said vanes of said pump unit having the ends thereof in engagement with the cylinder wall of said pump unit exposed to the pressure in said pump unit whereby said vanes collapse against said pilot pump pressure to thereby relieve pressure in the compression chambers of said pump unit.

5. A hydraulic transmission comprising; a pump unit consisting of a cylinder, a rotor disposed within said cylinder and having a plurality of vanes movable therein and extending therefrom into engagement with the walls of said cylinder, spring means for moving said cylinder with respect to said rotor to position the same eccentrically thereto and place said pump unit on full stroke position, servomotor means opposing said spring means for moving said cylinder to place the same on neutral position, manual means for moving said servomotor means and thus moving said cylinder to pre-set the position of the cylinder with respect to said rotor and control the volume delivery of said pump unit; a pilot pump drivingly connected to said pump unit for operation therewith, means controlling the maximum pressure developed by said pilot pump, means connecting the discharge side of said pilot pump to said servomotor for power actuation thereof, means for conducting fluid pressure from said pilot pump to the underside of said vanes in said pump unit rotor to regulate the force applied upon said vanes maintaining them in engagement with said pump unit cylinder, a motor unit consisting of a cylinder, a rotor disposed within said cylinder and having a plurality of vanes movable therein and extending therefrom into engagement with the walls of said cylinder, spring means for moving said cylinder with respect to said rotor to position the same eccentrically thereto and place said motor unit on full stroke position, manual means opposing said spring means for moving said cylinder to pre-set the position of the cylinder with respect to said rotor and control the output speed thereof; means connecting said pump unit and said motor unit in a closed fluid circuit relationship; said vanes of said pump unit having the ends thereof in engagement with the cylinder wall of said pump unit exposed to the pressure in said pump unit whereby said vanes collapse against said pilot pump pressure to thereby relieve pressure in the compression chambers of said pump unit, and means connecting the discharge side of said pump unit with said servomotor to actuate the same to overpower said pump unit spring means when the discharge pressure from the pump unit is greater than the force exerted by the pump unit spring means.

6. A hydraulic transmission comprising; a motor unit consisting of a cylinder, a rotor disposed within said cylinder having a plurality of vanes movable therein and extending therefrom into engagement with the walls of said cylinder, means for moving said cylinder with respect to said rotor to position the same eccentrically thereto for regulating the output speed of said motor unit; a pump unit consisting of a cylinder, a rotor disposed within said cylinder having an uneven number of vanes movable therein and extending therefrom into engagement with the walls of said cylinder, pilot pump means driven concomitantly with said pump unit and supplying fluid under pressure beneath the vanes thereof to hold them in engagement with the cylinder wall, a fluid inlet and a fluid outlet in said cylinder disposed on diametrically opposite sides of said rotor, land areas between said inlet and said outlet disposed on diametrically opposite sides of said rotor and 90° from said inlet and said outlet, said land areas being of equal length, spring means engaging said cylinder for positioning the same eccentric to said rotor; and means connecting said pump unit and said motor unit in a closed fluid relationship; whereby said pump unit automatically reduces its stroke in response to the internal pressure developed within said pump unit which opposes said spring means to urge said cylinder to neutral stroke position and thereby reduce fluid delivery to said motor unit in response to increased pressure in said motor unit and said pump unit as caused by an increased load on said motor unit, said vanes of said pump unit having their ends engaging the cylinder exposed to pump pressure whereby they collapse against pilot pump pressure retained against the opposite ends thereof to relieve excessive pressure in the pump unit.

WARREN R. TUCKER.

REFERENCES CITED

The following references are of record in the file of this patent:

UNITED STATES PATENTS

| Number | Name | Date |
|---|---|---|
| 1,244,878 | Manly | Oct. 30, 1917 |
| 2,056,896 | Douglas | Oct. 6, 1936 |
| 2,161,439 | Thoma | June 6, 1939 |
| 1,172,412 | Von Saalfeld | Feb. 22, 1916 |
| 1,572,576 | Thomas | Feb. 9, 1926 |
| 2,226,481 | Rose | Dec. 24, 1940 |
| 1,679,544 | Robson | Aug. 7, 1928 |
| 1,974,138 | Ferris et al. | Sept. 18, 1934 |
| 2,211,402 | Benedek | Aug. 13, 1940 |
| 1,914,090 | Hamilla et al. | June 13, 1933 |
| 2,255,782 | Kendrick | Sept. 16, 1941 |
| 1,385,840 | Manly | July 26, 1921 |

FOREIGN PATENTS

| Number | Country | Date |
|---|---|---|
| 420,976 | German | Nov. 3, 1925 |
| 517,652 | French | Dec. 20, 1920 |
| 788,035 | French | July 22, 1935 |